US008134962B2

(12) United States Patent
Yoon et al.

(10) Patent No.: US 8,134,962 B2
(45) Date of Patent: Mar. 13, 2012

(54) RESOURCE MANAGEMENT IN A WIRELESS COMMUNICATION NETWORK

(75) Inventors: Young C. Yoon, San Diego, CA (US); Li-Hsiang Sun, San Diego, CA (US); Shu Wang, San Diego, CA (US); Sang G. Kim, San Diego, CA (US); Suk Woo Lee, San Diego, CA (US)

(73) Assignee: LG Electronics Inc., Seoul (KR)

( * ) Notice: Subject to any disclaimer, the term of this patent is extended or adjusted under 35 U.S.C. 154(b) by 875 days.

(21) Appl. No.: 12/054,188

(22) Filed: Mar. 24, 2008

(65) Prior Publication Data

US 2009/0022097 A1    Jan. 22, 2009

Related U.S. Application Data

(60) Provisional application No. 60/896,831, filed on Mar. 23, 2007, provisional application No. 60/909,906, filed on Apr. 3, 2007, provisional application No. 60/910,420, filed on Apr. 5, 2007, provisional application No. 60/896,863, filed on Mar. 23, 2007.

(51) Int. Cl.
    *H04W 4/00* (2009.01)
(52) U.S. Cl. ....................................................... 370/329
(58) Field of Classification Search ................. 370/329, 370/330, 332, 338, 341, 342, 343, 345, 349, 370/389, 395.3, 395.4
    See application file for complete search history.

(56) References Cited

U.S. PATENT DOCUMENTS

| 7,764,662 | B2 * | 7/2010 | Oh et al. ................ 370/343 |
| 7,835,281 | B2 * | 11/2010 | Lee et al. ................ 370/232 |
| 2003/0050068 | A1 | 3/2003 | Woxberg et al. |
| 2006/0291393 | A1 | 12/2006 | Teague et al. |

FOREIGN PATENT DOCUMENTS

| EP | 1261222 | 11/2002 |
| EP | 1677460 | 7/2006 |
| KR | 1020040054062 | 6/2004 |
| KR | 1020060037199 | 5/2006 |
| WO | 2005/088871 | 9/2005 |
| WO | 2005/109695 | 11/2005 |
| WO | 2006/065069 | 6/2006 |
| WO | 2006/073258 | 7/2006 |
| WO | 2006/075870 | 7/2006 |
| WO | 2007/044173 | 4/2007 |

OTHER PUBLICATIONS

Nokia, "TS51.010-1; Removal of Fixed Allocation in section 41.x—GPRS Paging, TBF establishment/release and DCCH related procedures (Rel-4)," GP-020658, 3GPP TSG-GERAN #9, Apr. 2002.
TSG CN WG3, "CRs on pre-Rel-4 Work Item TEI," NP-030074, 3GPP TSG CN Plenary Meeting #19, Mar. 2003.
"Part 16: Air Interface for Fixed Broadband Wireless Access Systems," 802.16 IEEE Standard for Local and Metropolitan Area Networks, Oct. 2004.

* cited by examiner

*Primary Examiner* — Chi Pham
*Assistant Examiner* — Alexander Boakye
(74) *Attorney, Agent, or Firm* — Lee, Hong, Degerman, Kang & Waimey

(57) ABSTRACT

A method for advance allocation of one or more resources to a frame for a mobile communication terminal comprises transmitting resource allocation data in advance over several frames to allow for additional diversity in providing a mobile with resource allocation data.

20 Claims, 4 Drawing Sheets

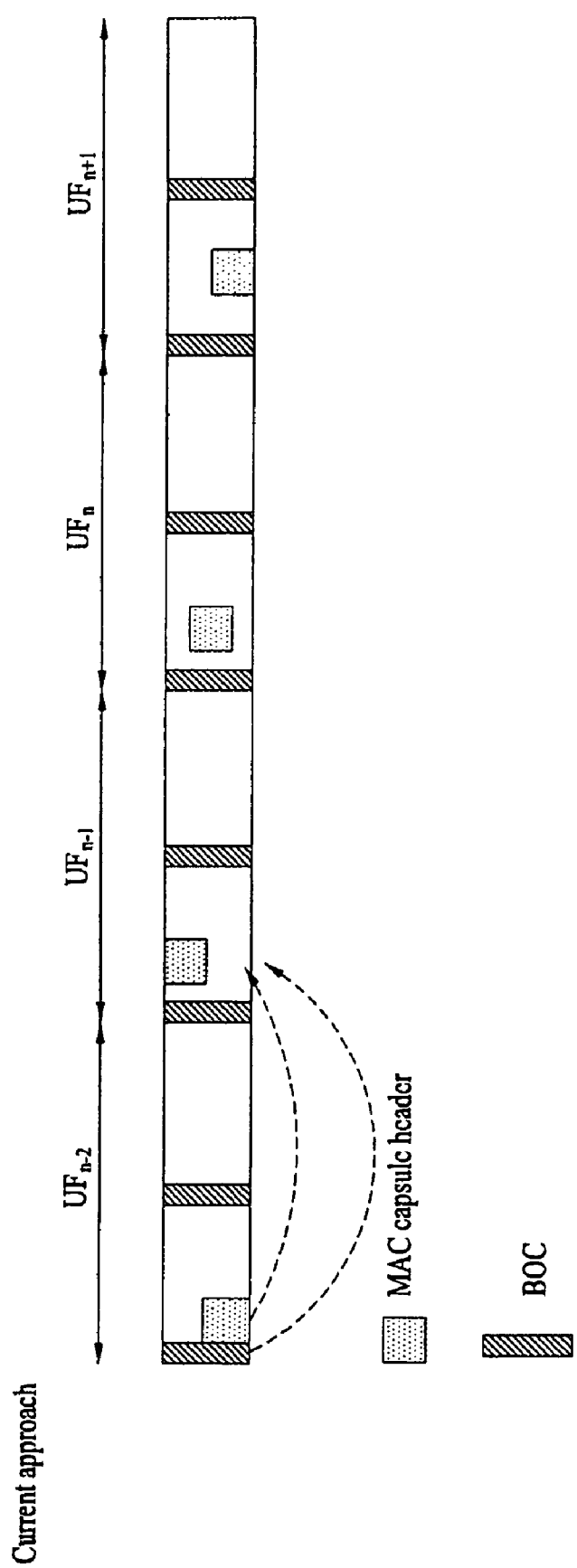

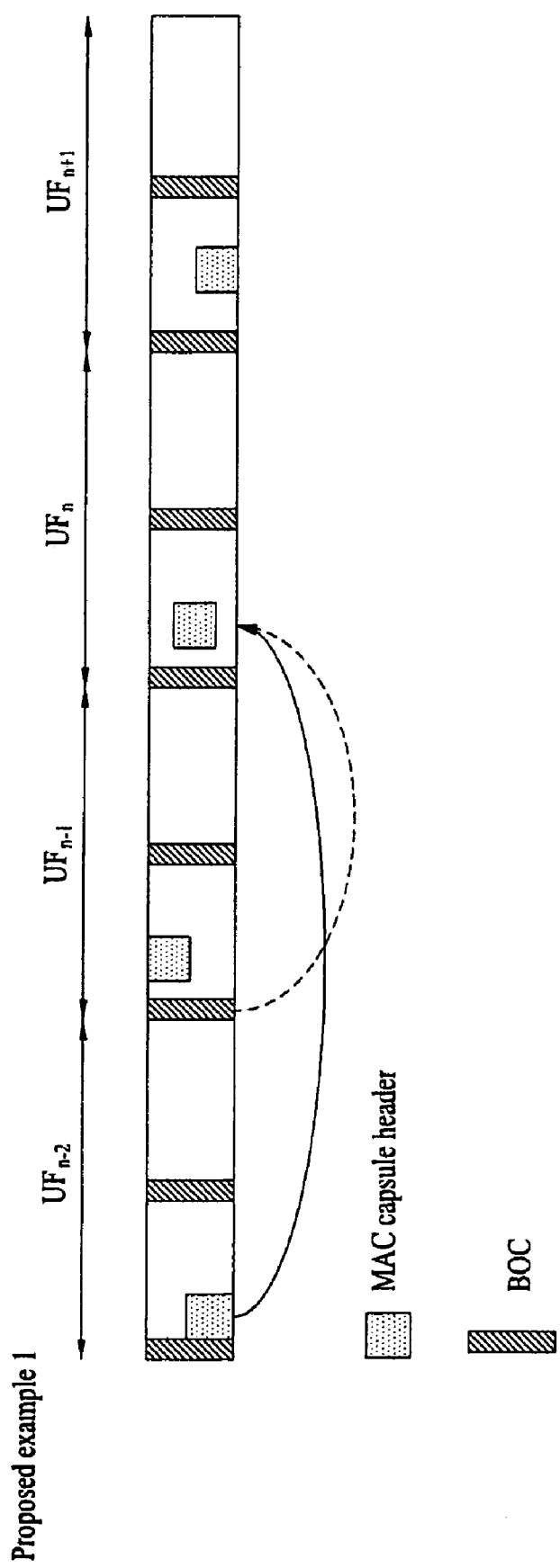

RESOURCE MANAGEMENT IN A WIRELESS COMMUNICATION NETWORK

CROSS-REFERENCED TO RELATED APPLICATIONS

This application claims the benefit of U.S. Provisional Application No. 60/896,863, filed on Mar. 23, 2007, which is hereby incorporated by reference.

TECHNICAL FIELD

The present invention relates to a method of using wireless telecommunication resources, and more particularly, to a method of allocating resources for efficient and effective wireless communication in a mobile network.

BACKGROUND

In the wireless telecommunication industry, 1G, 2G and 3G to the first, second and third generations of communication protocols used for enabling communication between mobile terminals in a cellular communication network.

1G refers to the analog phone system, known as an Advanced Mobile Phone Service (AMPS) phone system. 2G is commonly used to refer to the digital cellular systems that are currently prevalent, and include CDMAOne, Global System for Mobile communications (GSM), and Time Division Multiple Access (TDMA). 2G systems can support a greater number of users in a dense area than can 1G systems.

3G commonly refers to the digital cellular systems currently being deployed. These 3 G communication systems are conceptually similar to each other with some significant differences. In a wireless communication system, it is important to improve transmission efficiency for effective transmission of data. To this end, it is important that more efficient ways of data communication and resource management are developed.

Evolution-Data Optimized or Evolution-Data only, abbreviated as EV-DO or EVDO and often EV, is a telecommunications standard for the wireless transmission of data through radio signals, typically for broadband Internet access. It uses multiplexing techniques including CDMA as well as TDMA to maximize both individual user's throughput and the overall system throughput.

EVDO was designed to support high data rates and be deployed along side a wireless carrier's voice services. EVDO provides access to mobile devices with forward and reverse link air interfaces that are designed to be operated end-to-end as an IP based network. Thus, EVDO can support any application which can operate on such a network within certain bit rate constraints.

The primary characteristic of an EVDO communication channel is that it is time multiplexed on the forward link, that is from the access network (AN) to the access terminal (AT) (i.e., from the base station to the mobile). This means that a single mobile has full use of the forward traffic channel within a particular geographic area (a sector) during a given slot of time. Using this technique, each user's time slot is independently modulated. This allows better service to users that are in favorable radio frequency (RF) conditions with very complex modulation techniques and service to users in poor RF conditions with simpler and more redundant signals.

The forward channel may be divided into a plurality of slots also referred to as frames. In addition to user traffic, overhead channels are interlaced into the stream. These include the pilot channel which helps the mobile find and identify a traffic channel, the media access channel (MAC) which tells the mobile when data designated for that mobile is scheduled to be transmitted over a traffic channel, and one or more logical channel (e.g., control channels) which provide other information (e.g., resource allocation data) that a mobile needs to know to properly communicate in a wireless network.

Referring to FIG. 1A, resource allocation data for a frame (e.g., an Ultra Frame (UF)) is specified in-band in the MAC header, or in a broadcast overhead channel (BOC), one frame ahead. Data in the MAC header is used by a mobile so that the mobile need not monitor the BOC if it has already decoded a packet received in a current frame. The resource allocation data transmitted over the BOC may be used by newly joined mobiles that have not had the opportunity to decode the earlier frame, or by the mobiles that monitor a logical channel which does not have data to receive in that frame. It is desirable to provide additional redundancy in the number of frames or channels that carry the resource allocation data to increase efficiency and reduce error rates cause by lost packets that carry resource allocation data.

Furthermore, in a cellular communication network, the current approach to allocating resources in a cell is to designate more resources to cells in the boundaries of a cellular zone than to the cells that are within the central area of a zone. The inner cells have over-the-air combined advantage. That is, if a mobile station is in the cell which is located in the center of a broadcast zone, it is most likely to have better broadcast signal strength because all the neighboring cells are transmitting the same signal. However, the mobile station located in a cell at the edge of a broadcast zone does not have this advantage. For the cell at the zone's edge, additional radio resources are allocated to make the same signal more reliable.

A disadvantage of the above noted approach is that since the cells in the bordering areas of the zone are designated as having more resources, the resource allocation information varies from cell to cell. That is, the same BOC cannot be utilized for all the cells in the same zone. Also, the MAC header has to be custom configured for each cell to only include the resource allocation data for that cell. It is desirable to use the same BOC or have the same resource allocation data included in the MAC header in all cells of a broadcast zone such that the signals for BOC & MAC header are identical and these signals from different cells can be over-the-air combined.

SUMMARY

For purposes of summarizing, certain aspects, advantages, and novel features of the invention have been described herein. It is to be understood that not all such advantages may be achieved in accordance with any one particular embodiment of the invention. Thus, the invention may be embodied or carried out in a manner that achieves or optimizes one advantage or group of advantages without achieving all advantages as may be taught or suggested herein.

In one embodiment, a method for advance allocation of one or more resources to a frame for a mobile communication terminal comprises including resource allocation data for a frame N in a first MAC header transmitted in association with a first packet transmitted in a frame N–X, wherein the first MAC header is included in a first packet transmitted X frames prior to a packet transmitted in the frame N, and wherein X is greater than 0. The method may further comprise transmitting the resource allocation data for the frame N over a broadcast overhead channel (BOC) associated with the frame N–Y, wherein Y is not equal to X. The method may further comprise transmitting additional resource allocation data for the frame N over a broadcast overhead channel (BOC) or a MAC header associated with the frame N−Z, wherein Z is not equal to Y or X, for example.

In another embodiment, a method for allocation of resources in a set X to a first cell and allocation of resources in a set Y to a second cell, is provided wherein both the first and the second cells are in a first zone but in different geographic neighborhoods. The method comprises transmitting resource allocation data to at least one mobile communication terminal in the first zone, using a single frequency network message transmitted from one or more cells in the first zone that identifies a union of sets X and Y as resources allocated to the one or more cells in the first zone; wherein a first mobile communication terminal in the first cell is notified that resources in the set X are designated for allocation to the first cell, in response to receiving a first non single frequency network notification message.

Desirably a second mobile communication terminal in the second cell is notified that resources in the set Y are designated for allocation to the second cell, in response to receiving a second non single frequency network notification message. Information delivered by the allocated resources in both the first and the second geographical neighborhoods in the first zone is identical.

In accordance with another embodiment, a system comprising one or more logic units is provided. The one or more logic units are configured to perform the functions and operations associated with the above-disclosed methods. In accordance with yet another embodiment, a computer program product comprising a computer useable medium having a computer readable program is provided. The computer readable program when executed on a computer causes the computer to perform the functions and operations associated with the above-disclosed methods.

One or more of the above-disclosed embodiments in addition to certain alternatives are provided in further detail below with reference to the attached figures. The invention is not, however, limited to any particular embodiment disclosed.

BRIEF DESCRIPTION OF THE DRAWINGS

Embodiments of the present invention are understood by referring to the figures in the attached drawings, as provided below.

FIGS. 1A-1C illustrate exemplary resource allocation approaches using a MAC header and a BOC, in accordance with one embodiment.

Features, elements, and aspects of the invention that are referenced by the same numerals in different figures represent the same, equivalent, or similar features, elements, or aspects, in accordance with one or more embodiments.

DETAILED DESCRIPTION OF EXAMPLE EMBODIMENTS

In accordance with one aspect of the invention, a method for allocation of one or more resources for a mobile communication terminal is provided. The method comprises including resource allocation data for a frame N in a first MAC header transmitted in association with a first packet transmitted in a frame N−X; such that N and X are integers and X is a positive number. The first MAC header may be included in a first packet transmitted X frames prior to a packet transmitted in the frame N.

In one or more embodiments, the resource allocation data may be transmitted for the frame N over the BOC associated with the frame N−Y (e.g., N−X+1); such that Y is not equal to X. Additional resource allocation data may be also transmitted for the frame N over the BOC or the MAC header associated with the frame N−Z, such that Z is not equal to Y or X.

Allocating the resources as noted above allows for additional diversity in providing a mobile with resource allocation data, so that if the mobile misses or does not receive the resource allocation data due to an error, or other difficulties, the mobile will have additional chances to retrieve the resource allocation data by other means.

Referring to FIG. 1B, for example, in accordance with one embodiment, the resource allocation data may be included in a MAC header several frames (e.g., 2 Ufs) ahead, instead of being included in a previous frame (e.g., as shown in FIG. 1A). In this manner, if the mobile does not receive the resource allocation data in the MAC header transmitted in UF n−2 (i.e., the frame preceding the immediately preceding frame), the mobile has a second chance to receive the same data included in the MAC header transmitted with UF n−1 (i.e., the immediately preceding frame).

In certain embodiments, to provide additional redundancy, resource allocation data may be also include over a BOC transmitted during multiple frames (e.g., UF n−2 and UF n−1), instead of being transmitted only over a BOC transmitted during a single frame. The transmission of resource allocation data over the BOC may be combined with inclusion of the resource allocation data in multiple MAC headers, depending on implementation.

Referring back to FIG. 1B, for example, it can be seen that in contrast to FIG. 1A, the resource allocation data for UF n is transmitted over the BOC associated with UF n−1, while the same resource allocation data is also transmitted in a MAC header associated with UF n−2. In this manner, a mobile that has missed a data packet transmitted in an earlier frame may be able to retrieve the resource allocation data by tuning into the BOC during a subsequent frame.

Figure 1C:
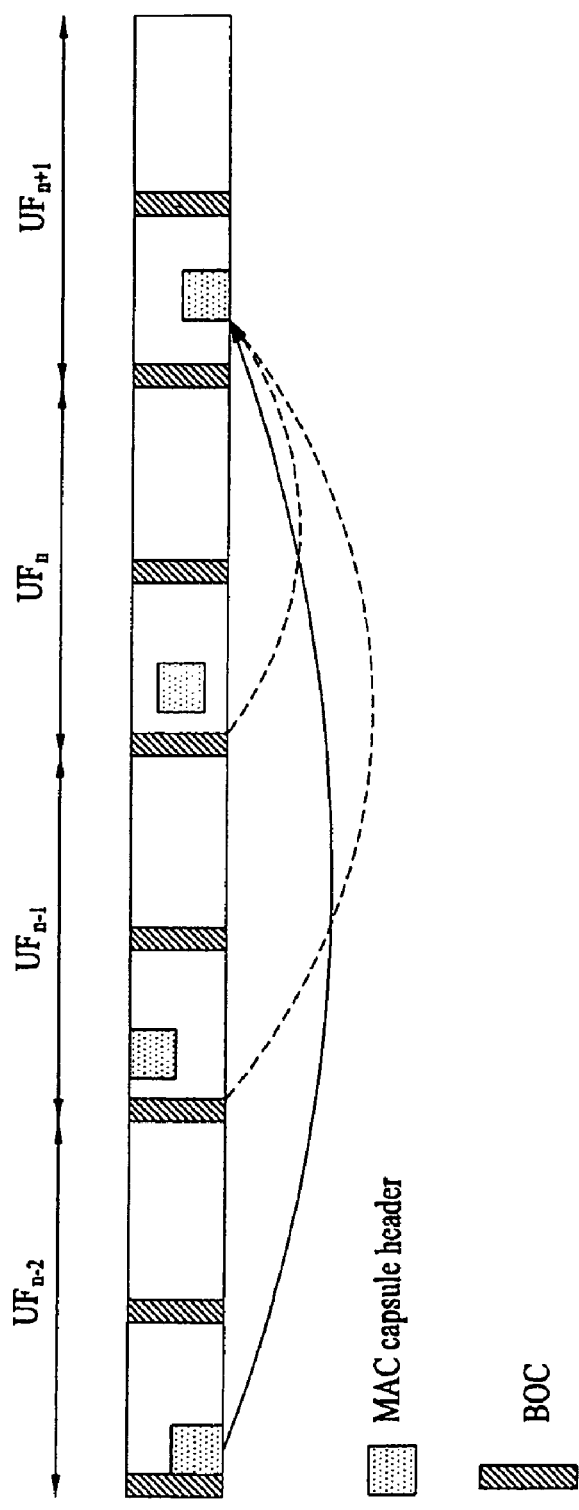

Referring to FIG. 1C, as another example, the resource allocation data may be included in a MAC header three frames (e.g., 3 UFs) ahead, and the same information may be repeated over the BOC transmitted several frames (e.g., 2 Ufs) ahead. In this example, if the mobile does not receive the resource allocation data in the MAC header associated with UF n−3, then the mobile may still be able to retrieve the resource allocation data from the BOC transmitted in UF n−2, or UF n1.

It is noteworthy that other variation of the above implementations may be possible to build additionally redundancy in a network. That is, resource allocation data associated with a target frame may be included in a MAC header or a BOC associated with other frames that are transmitted in advance of the target frame in many different combinations. For example, the additional resource allocation data may be provided 2, 3, 4, or n frames in advance either over the BOC or in a MAC header, in order to provide redundancy and thus reduce error rate associated with undelivered packets.

In accordance with another aspect of the invention, where a plurality of cells exist within a cellular network, more resources are allocated to cells in the boundary areas of a zone than to the cells that are within the central area of a zone for broadcasting information. In this manner, the inner cells take advantage of over-the-air combined transmission of all the cells in that zone, such that if a mobile station is in the cell which is located in the center of a broadcast zone, it is most likely to have better broadcast signal strength because all the neighboring cells are transmitting the same signal. However, the mobile station located in the cell at the edge of a broadcast zone does not have this advantage. For the cell at the zone's edge, additional radio resources are allocated to make the same signal more reliable.

It is desirable to transmit the same resource allocation data in a BOC or MAC header in all cells of a broadcast zone such that the signals for BOC & MAC header are identical and these signals from different cells can be over-the-air combined. In some embodiments, the resource allocation information may be different between cells in the center or the edge of a zone.

To overcome the above problems, in accordance with one embodiment, the MAC header and the BOC are configured to include resource allocation data for all cells. In one implementation, the cell that has less resources allocated to it may transmit a notification on which resources to ignore. In an alternative implementation, the cell that has less resources allocated to it may transmit a notification indicating that certain resources allocated for broadcasting purpose in the zone are used for another purpose in the cell. In this manner, the number of resources allocated to all cells designated in BOC and MAC header is the same. That is, regardless of the number of resources allocated to each cell, all cells receive the same resource allocation data in a BOC or MAC header.

In one embodiment, to provide a cell with information about the resources allocated to it, a signal is transmitted from the cell designating the target resources, so that the receiver in each cell knows to ignore the resources that are not allocated to it, even though the resource allocation data for such resources is included in the BOC or the MAC header. In the alternative embodiment, a signal may be sent to a mobile (e.g., a non-broadcast receiving mobile terminal) to use the excluded resources.

Figure 2:
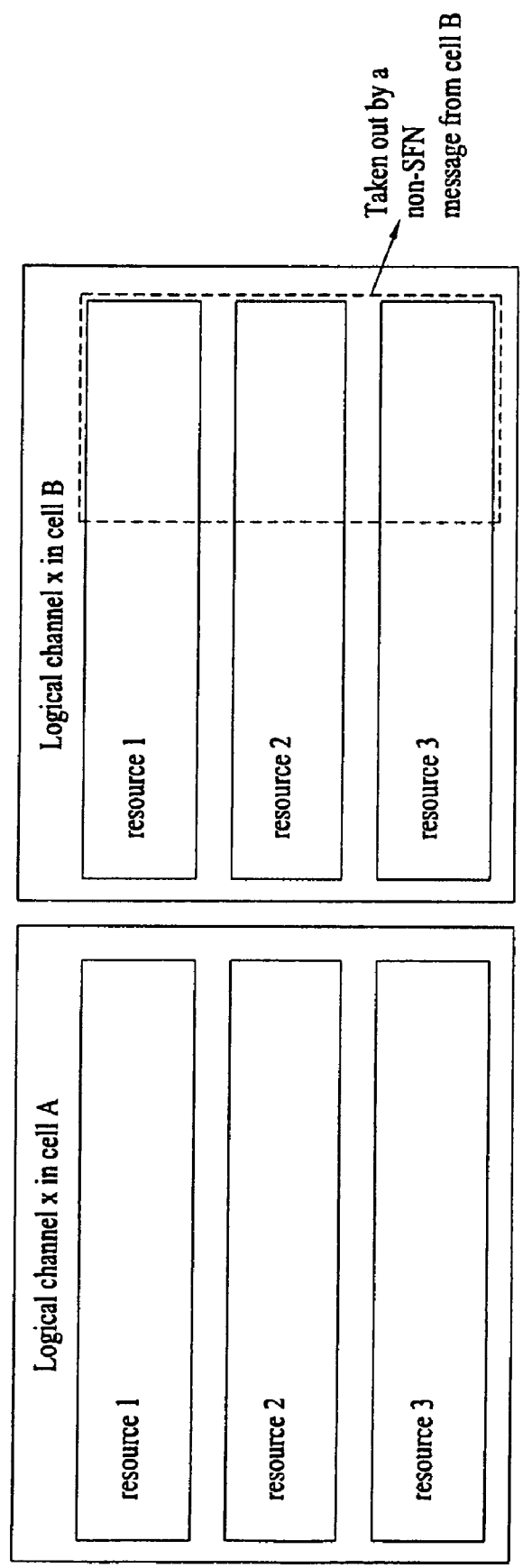
FIG. 2 is an exemplary logical channel definition, in accordance with one embodiment.

Referring to FIG. 2, a cell in the center of a zone, which has less broadcast resources associated with it, may use a non single frequency network (SFN) message to indicate to mobiles in that cell that a portion of resources are not configured to be or do not support Broadcast Multicast Services (BCMCS). This may not need extra resource because the primary broadcast control channel (PBCCH) of the sector may not configure the excluded resource for BCMCS. No extra messages may be needed for the exclusion information. For the cells at the edge of the zone, the above-noted approach provides an SFN gain on BOC, and MAC capsule header.

In one embodiment, the BOC may be utilized to designate the resources of all sub-zones which have different resources assignments, as well as their associated sectorIDs. The mobile thus may know which zone it is in, based on the current sectoreID in its active set. The BOC may be also utilized to designate the resources of all sub-zones which have different resources assignments. A non-SFN message may be used to inform the mobile of its sub-zone ID.

In one embodiment, the resources taken out in the inner zones may be also designated or advertised in a BCMCS logical channel, such that the exclusion information also has SFN gain. Similarly, the resources added in the outer zones are also advertised in a BCMCS logical channel, such that the inclusion information also has SFN gain.

Depending on implementation, it is possible that the present invention can take the form of an entirely hardware embodiment, an entirely software embodiment or an embodiment containing both hardware and software elements. A software embodiment may include, but not be limited to, to firmware, resident software, microcode, etc.

Furthermore, the invention can take the form of a computer program product accessible from a computer-usable or computer-readable medium providing program code for use by or in connection with a computer or any instruction execution system. For the purposes of this description, a computer-usable or computer readable medium can be any apparatus that can contain, store, communicate, propagate, or transport the program for use by or in connection with the instruction execution system, apparatus, or device.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Other components may be coupled to the system. Input/output or I/O devices (including but not limited to keyboards, displays, pointing devices, etc.) can be coupled to the system either directly or through intervening I/O controllers. Network adapters (e.g., modem, cable modem, Ethernet cards) may also be coupled to the system to enable the data processing system to become coupled to other data processing systems or remote printers or storage devices through intervening private or public networks.

It should be understood that the logic code, programs, modules, processes, methods, and the order in which the respective elements of each method are performed are purely exemplary. Depending on the implementation, they may be performed in any order or in parallel, unless indicated otherwise in the present disclosure. Further, the logic code is not related, or limited to any particular programming language, and may be comprise one or more modules that execute on one or more processors in a distributed, non-distributed, or multiprocessing environment.

The method as described above may be used in the fabrication of integrated circuit chips. The resulting integrated circuit chips can be distributed by the fabricator in raw wafer form (that is, as a single wafer that has multiple unpackaged chips), as a bare die, or in a packaged form. In the latter case, the chip is mounted in a single chip package (such as a plastic carrier, with leads that are affixed to a motherboard or other higher level carrier) or in a multi-chip package (such as a ceramic carrier that has either or both surface interconnections of buried interconnections).

In any case, the chip is then integrated with other chips, discrete circuit elements, and/or other signal processing devices as part of either (a) an intermediate product, such as a motherboard, or (b) and end product. The end product can be any product that includes integrated circuit chips, ranging from toys and other low-end applications to advanced computer products having a display, a keyboard or other input device, and a central processor.

Therefore, it should be understood that the invention can be practiced with modification and alteration within the spirit and scope of the appended claims. The description is not intended to be exhaustive or to limit the invention to the precise form disclosed. These and various other adaptations and combinations of the embodiments disclosed are within the scope of the invention and are further defined by the claims and their full scope of equivalents.

What is claimed is:

1. A method for advance allocation of one or more resources to a frame for a mobile communication terminal, the method comprising:

transmitting, by a transmitter of a mobile network to a receiver of the mobile network, a first packet in a frame N−X, wherein the first packet comprises a first MAC header, and wherein the first MAC header includes resource allocation data for a frame N, wherein the first MAC header is included in a first packet transmitted X frames prior to a packet transmitted in the frame N, and wherein X is greater than 0.

2. The method of claim 1 further comprising:
transmitting, by the transmitter to the receiver, the resource allocation data for the frame N over a broadcast overhead channel (BOC) associated with the frame N−Y, wherein Y>0.

3. The method of claim 2 further comprising:
transmitting, by the transmitter to the receiver, the resource allocation data for the frame N over a broadcast overhead channel (BOC) associated with the frame N−Z, wherein Z>0.

4. The method of claim 2 wherein Y=X+1.

5. The method of claim 3 wherein N=X+2.

6. The method of claim 1 further comprising:
transmitting, by the transmitter to the receiver, a second packet in a frame N−W, wherein the second packet comprises a second MAC header, and wherein the second MAC header includes resource allocation data for the frame N, wherein the second MAC header is included in a second packet transmitted W frames prior to the packet transmitted in the frame N, wherein W>0.

7. The method of claim 6 wherein W=X+1.

8. A non-transitory computer-readable medium having computer-executable instructions that, when executed, perform a method for advance allocation of one or more resources to a frame for a mobile communication terminal, the method comprising: transmitting, from a transmitter to a receiver of the mobile network, a first packet in a frame N−X, wherein the first packet comprises a first MAC header, and wherein the first MAC header includes resource allocation data for a frame N, wherein the first MAC header is included in a first packet transmitted X frames prior to a packet transmitted in the frame N, and wherein X is greater than 0.

9. The computer-readable medium of claim 8 wherein the method further comprises:
transmitting, from the transmitter to the receiver, the resource allocation data for the frame N over a broadcast overhead channel (BOC) associated with the frame N−Y,
wherein Y>0.

10. The computer-readable medium of claim 9 wherein the method further comprises:
transmitting, from the transmitter to the receiver, the resource allocation data for the frame N over a broadcast overhead channel (BOC) associated with the frame N−Z,
wherein Z is not equal to Y.

11. The computer-readable medium of claim 8 wherein the method further comprises:
transmitting, from the transmitter to the receiver, a second packet in a frame N−W, wherein the second packet comprises a second MAC header, and wherein the second MAC header includes resource allocation data for the frame N,
wherein W>0.

12. A method for allocation of resources in a set X to a first cell and allocation of resources in a set Y to a second cell, wherein both the first and the second cells are in a first zone but in different geographic neighborhoods, the method comprising:
transmitting resource allocation data to at least one mobile communication terminal in the first zone, using a single frequency network message transmitted from cells in the first zone that identifies a union of sets X and Y as resources allocated to cells in the first zone;
wherein a first mobile communication terminal in the first cell is notified that resources in the set X are designated for allocation to the first cell, in response to receiving a first non single frequency network notification message, and
wherein a second mobile communication terminal in the second cell is notified that resources in the set Y are designated for allocation to the second cell, in response to receiving a second non single frequency network notification message.

13. The method of claim 12, wherein information delivered by the allocated resources in both the first and the second geographical neighborhoods in the first zone is identical.

14. A method for allocation of one or more resources to one or more cells, the method comprising:
determining number of resources for each cell in a zone, wherein N resources are allocated to a first cell in a first geographical neighborhood in a first zone and M resources are allocated to a second cell in a second geographical neighborhood in the first zone, wherein M is a subset of N;
transmitting resource allocation data from the first and second cells to at least one mobile communication terminal in the first zone, using a single frequency network message transmitted from cells in the first zone that identifies N resources allocated to cells in the first zone; and
notifying a first mobile communication terminal in the second cell of resources that are in M, through a non single frequency network message such that the first mobile communication terminal is notified to receive information delivered by resources in M.

15. The method of claim 14 further comprising:
notifying a second mobile communication terminal of resources that are in N exclusive of resources in M, through a non single frequency network message,
wherein said resources are utilized for delivery of information different than that delivered to the first mobile communication terminal.

16. A method for allocation of one or more resources to one or more cells, the method comprising:
determining number of resources for each cell in a zone, wherein N resources are allocated to a first cell in a first geographical neighborhood in a first zone and M resources are allocated to a second cell in a second geographical neighborhood in the first zone, wherein M is a subset of N;
transmitting resource allocation data to at least one mobile communication terminal in the first zone, using a single frequency network message transmitted from cells in the first zone that identifies N resources allocated to cells in the first zone; and
notifying a first mobile communication terminal in the second cell of resources that are in N exclusive of resources in M, through a non single frequency network message such that the first mobile communication terminal is notified to receive information through resources in M.

17. A non-transitory computer-readable medium having computer-executable instructions that, when executed, perform a method for allocation of resources in a set X to a first cell and allocation of resources in a set Y to a second cell, wherein both the first and the second cells are in a first zone but in different geographic neighborhoods, the method comprising: transmitting, by a transmitter, resource allocation data to at least one mobile communication terminal in the first zone, using a single frequency network message transmitted from all cells in the first zone that identifies a union of sets X and Y as resources allocated to all cells in the first zone; wherein a first mobile communication terminal in the first cell is notified that resources in the set X are designated for allocation to the first cell, in response to receiving a first non single frequency network notification message, and wherein a second mobile communication terminal in the second cell is notified that resources in the set Y are designated for allocation to the second cell, in response to receiving a second non single frequency network notification message.

18. The computer-readable medium of claim 17, wherein information delivered by the allocated resources in both the first and the second geographical neighborhoods in the first zone is identical.

19. A non-transitory computer-readable medium having computer-executable instructions that, when executed, perform a method for allocation of one or more resources to one or more cells, the method comprising: determining, by a transmitter, number of resources for each cell in a zone, wherein N resources are allocated to a first cell in a first geographical neighborhood in a first zone and M resources are allocated to a second cell in a second geographical neighborhood in the first zone, wherein M is a subset of N; transmitting, by the transmitter, resource allocation data from the first and second cells to at least one mobile communication terminal in the first zone, using a single frequency network message transmitted from one or more cells in the first zone that identifies N resources allocated to one or more cells in the first zone; and notifying, by the transmitter, a first mobile communication terminal in the second cell of resources that are in M, through a non single frequency network message such that the first mobile communication terminal is notified to receive information delivered by resources in M.

20. The computer-readable medium of claim 19 wherein the method further comprises:
notifying, by the transmitter, a second mobile communication terminal of resources that are in N exclusive of resources in M, through a non single frequency network message, wherein said resources are utilized for delivery of information different than that delivered to the first mobile communication terminal.

* * * * *